United States Patent
Monahan et al.

(10) Patent No.: US 6,817,457 B2
(45) Date of Patent: Nov. 16, 2004

(54) TWO-WAY ROLLER CLUTCH WITH TORQUE LIMITING FEATURE

(75) Inventors: Russell E. Monahan, Ann Arbor, MI (US); Thomas Houtman, Ann Arbor, MI (US); Shiro Goto, Plymouth, MI (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/200,706

(22) Filed: Jul. 22, 2002

(65) Prior Publication Data

US 2003/0024783 A1 Feb. 6, 2003

Related U.S. Application Data

(60) Provisional application No. 60/308,022, filed on Jul. 26, 2001.

(51) Int. Cl.[7] .......................... F16D 47/02; F16D 15/00; B62D 5/04
(52) U.S. Cl. .......................... 192/38; 192/44; 192/55.1; 180/444
(58) Field of Search .......................... 192/38, 44, 55.1; 180/444

(56) References Cited

U.S. PATENT DOCUMENTS

| | | | | |
|---|---|---|---|---|
| 4,132,297 A | * | 1/1979 | Brown et al. | 192/36 |
| 4,848,508 A | * | 7/1989 | Smirl et al. | 180/248 |
| 4,852,707 A | * | 8/1989 | Ito et al. | 192/44 |
| 5,672,110 A | * | 9/1997 | Kurita et al. | 464/37 |
| 6,062,361 A | * | 5/2000 | Showalter | 192/38 |
| 6,231,448 B1 | * | 5/2001 | Abe et al. | 464/46 |

\* cited by examiner

*Primary Examiner*—Richard M. Lorence
(74) *Attorney, Agent, or Firm*—Warn, Hoffmann, Miller & LaLone, P.C.

(57) ABSTRACT

A clutch system is described wherein a two-way roller clutch system transmits torque in from one direction (i.e., input side) only, and allows the clutch system to be physically decoupled from the power steering system when torque is forced in from the output side, e.g., during loss of electrical power to the power steering motor. Additionally, the clutch system can include a torque limiting system that permits slip when overall torque exceeds a preset limit. Both the clutch system and the torque limitation system are especially useful in conjunction with automotive power steering systems.

39 Claims, 4 Drawing Sheets

TWO-WAY ROLLER CLUTCH WITH TORQUE LIMITING FEATURE

CROSS-REFERENCE TO RELATED APPLICATION

The present invention claims priority to U.S. Provisional Patent Application Ser. No. 60/308,022 filed Jul. 26, 2001, the entire specification of which is expressly incorporated herein by reference.

FIELD OF THE INVENTION

The present invention relates generally to clutches such as those used in conjunction with automotive power steering systems and more particularly to a new and improved clutch system and torque limitation system, both especially for useful in conjunction with automotive power steering systems. The new and improved clutch system includes a passively actuated system that permits torque transmission from one direction only. The torque limitation system includes a feature for allowing slip, for example, at or above a preset torque level.

BACKGROUND OF THE INVENTION

The advent of automotive electric power assisted steering (EPAS) systems will greatly enhance the ease of steering and overall drivability of modern automobiles. This is especially true for individuals, such as the elderly and the disabled, who may not possess the requisite physical strength to turn an unassisted (i.e., un-powered) automobile steering wheel in a reasonably safe and effective manner.

However, there are several problems with electrical power steering systems. For example, in the event of a failure of the automobile's electrical system or the electrical power assist motor; the torque necessary to turn the steering wheel would be relatively unsafe due to the high-speed reduction ratio in the system. Such difficulty in turning the steering wheel could potentially result in an increased frequency of accidents.

Additionally, "kickback" from impact with road hazards, such as curbs, bumps, potholes, and so forth, can potentially damage the power steering system's speed reduction system.

Therefore, there exists a need for a new and improved power steering system wherein torque is transmitted from one direction (e.g., input side) only, and allows the system to be decoupled completely from the power steering motor when torque is forced in from the output side. Additionally, the new and improved power steering system should include a torque limiting system that permits slip when overall torque exceeds a preset and/or predetermined limit.

SUMMARY OF THE INVENTION

In accordance with the general teachings of the present invention, a clutch system is provided wherein torque transmission is permitted out in one direction only (i.e., output side), thus eliminating feedback (e.g., kickback). Also in accordance with the general teachings of the present invention, a torque limiting system is provided wherein slip is permitted when the overall torque of the system exceeds a preset and/or predetermined level.

In accordance with further teachings of the present invention, a clutch system for a power steering system is provided wherein torque transmission is permitted out in one direction only (i.e., output side), thus eliminating feedback (e.g., kickback) while also limiting overall torque to a preset and/or predetermined level. The present invention is preferably installed between the electric power steering motor and the speed reduction device on the rack of the electrically assisted power steering system, e.g., for automotive applications.

In accordance with the first embodiment of the present invention, a clutch system having a power input member and a power output member is provided, comprising:

a clutch member being coaxially disposed about the power input member, the clutch member being in physical cooperation with the power input member and the power output member, the clutch member being capable of rotating in either a first or a second direction in response to a torque force from the power input member;

an inner race member being coaxially disposed about the clutch member, the inner race member being in physical cooperation with the clutch member, the inner race member being capable of rotating in either a first or a second direction in response to a torque force from the power input member;

an outer race member being coaxially disposed about the inner race member, the outer race member being in physical cooperation with the inner race member, the outer race member being capable of rotating in either a first or a second direction in response to a torque force from the power input member; and a roller member disposed between the inner and outer race members;

wherein the roller member is selectively operable so as to physically engage at least a portion of a surface of the outer and inner race members so as to cause the clutch member to physically engage the power output member in response to a torque force being applied to the power input member in either a first or a second direction and to physically disengage from at least a portion of a surface of the outer or inner race members so as to cause the clutch member to disengage from the power output member in response to a torque force being applied to the power output member in either a first or a second direction.

In accordance with a second embodiment of the present invention, a clutch system for use in conjunction with a power assisted steering system for a vehicle is provided, wherein the power assisted steering system includes a power steering motor, a power input member capable of rotating in either a first or a second direction in response to a torque force, and a power output member, the power input member being in physical cooperation with the power steering motor, comprising:

a clutch member being coaxially disposed about the power input member, the clutch member being in physical cooperation with the power input member and the power output member, the clutch member being capable of rotating in either a first or a second direction in response to a torque force from the power input member;

an inner race member being coaxially disposed about the clutch member, the inner race member being in physical cooperation with the clutch member, the inner race member being capable of rotating in either a first or a second direction in response to a torque force from the power input member;

an outer race member being coaxially disposed about the inner race member, the outer race member being in physical cooperation with the inner race member, the outer race member being capable of rotating in either a first or a second direction in response to a torque force from the power input member; and a roller member disposed between the inner and outer race members;

wherein the roller member is selectively operable so as to physically engage at least a portion of a surface of the outer and inner race members so as to cause the clutch member to physically engage the power output member in response to a torque force being applied to the power input member in either a first or a second direction and to physically disengage from at least a portion of a surface of the outer or inner race members so as to cause the clutch member to disengage from the power output member in response to a torque force being applied to the power output member in either a first or a second direction.

In accordance with a third embodiment of the present invention, a power assisted steering system for a vehicle is provided, comprising:

a power steering motor;

a power output member capable of rotating in either a first or a second direction in response to a torque force, the power output member being in physical cooperation with the power steering motor; and a clutch system disposed between the power steering motor and the power output member, the clutch system member being coaxially disposed about the power output member, the clutch system being in physical cooperation with the power output member;

wherein the clutch system is selectively operable to physically disengage from the power output member in response to a torque force being applied to the power output member in either a first or a second direction.

In accordance with a fourth embodiment of the present invention, a power assisted steering system for a vehicle is provided, comprising:

a power steering motor;

a power input member capable of rotating either in a first or a second direction in response to a torque force, the power input member being in physical cooperation with the power steering motor;

a clutch system disposed between the power steering motor and a power output member, the clutch system member being coaxially disposed about the power output member, the clutch system being in physical cooperation with the power output member, wherein the clutch system comprises:

a clutch member being coaxially disposed about the power input member, the clutch member being in physical cooperation with the power input member, the clutch member being capable of rotating in either a first or a second direction in response to a torque force from the power input member;

an inner race member being coaxially disposed about the clutch member, the inner race member being in physical cooperation with the clutch member, the inner race member being capable of rotating in either a first or a second direction in response to a torque force from the power input member;

an outer race member being coaxially disposed about the inner race member, the outer race member being in physical cooperation with the inner race member, the outer race member being capable of rotating in either a first or a second direction in response to a torque force from the power output member; and a roller member disposed between the inner and outer race members;

wherein the roller member is selectively operable so as to physically engage at least a portion of a surface of the outer and inner race members so as to cause the clutch member to physically engage the power output member in response to a torque force being applied to the power input member in either a first or a second direction and to physically disengage from at least a portion of a surface of the outer or inner race members so as to cause the clutch member to disengage from the power output member in response to a torque force being applied to the power output member in either a first or a second direction.

In accordance with a fifth embodiment of the present invention, a torque limitation system is provided, comprising:

a housing member;

a power output member capable of rotation in response to a torque force, the power output member being capable of rotating relative to the housing member; and at least one clutch member in physical cooperation with the housing member and the power output member, the clutch member having a compressive force applied thereto so as to establish a preset torque level between the housing member and the power output member;

wherein the at least one clutch member is selectively operable so as to slip in response to the application of a torque force in excess of the preset torque level.

In accordance with a sixth embodiment of the present invention, a torque limitation system for use in conjunction with a power assisted steering system for a vehicle is provided, comprising:

a housing member;

a power output member capable of rotation in response to a torque force, the power output member being capable of rotating relative to the housing member; and at least one clutch member in physical cooperation with the housing member and the power output member, the clutch member having a compressive force applied thereto so as to establish a preset torque level between the housing member and the power output member;

wherein the at least one clutch member is selectively operable so as to slip in response to the application of a torque force in excess of the preset torque level.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
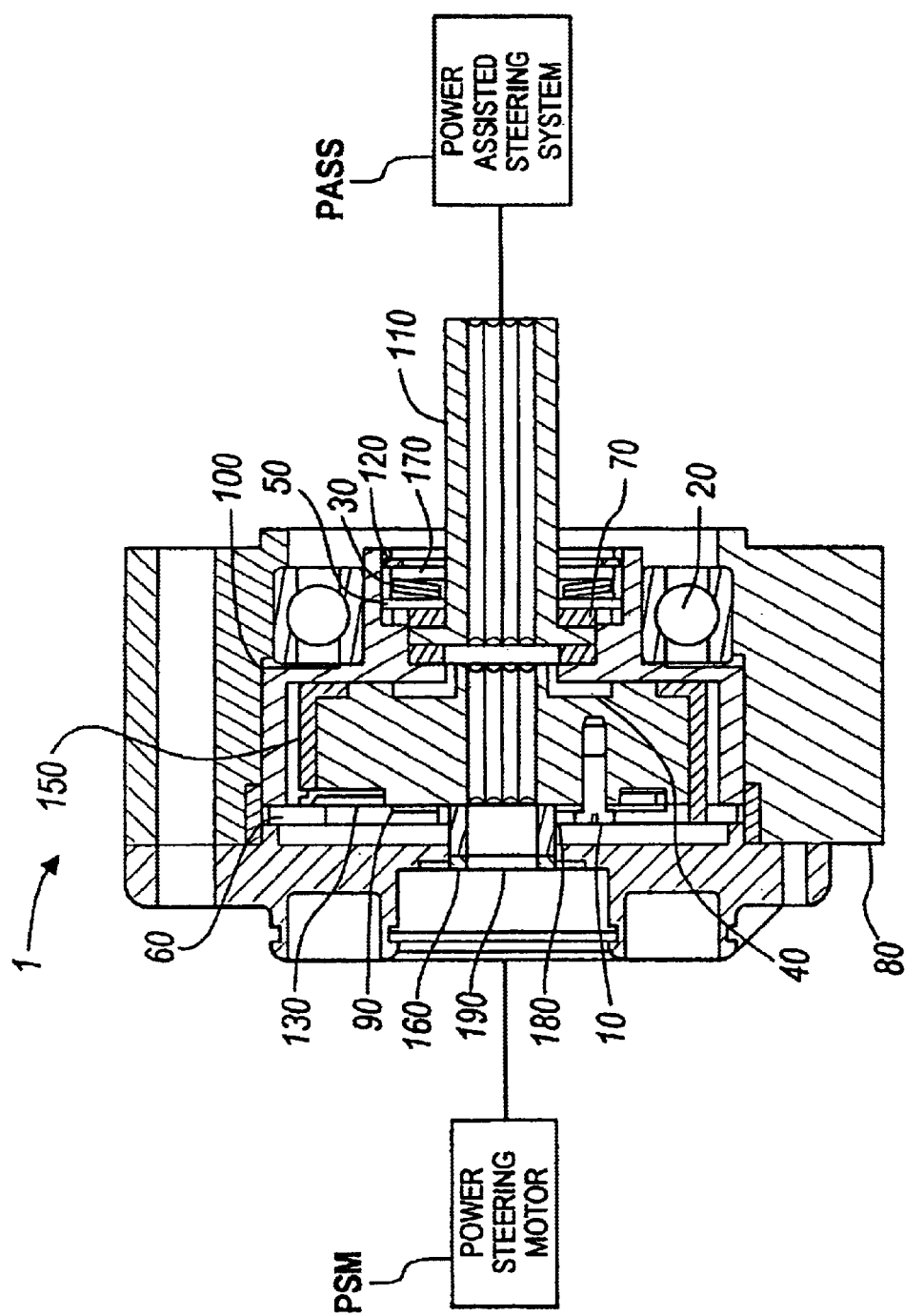
FIG. 1 is a partial schematic view of the clutch system for an exemplary power steering system, in accordance with the general teachings of the present invention.

The following description of the preferred embodiment(s) is merely exemplary in nature and is in no way intended to limit the invention, its application, or uses.

While the present invention is described primarily as a torque-limited, unidirectional drive clutch system in conjunction with an electrical power assisted steering system for automotive applications, it should be appreciated that the present invention can be practiced with any type of power, force, or torque transmission system where torque limitation and/or unidirectional drive are desired in the event of the loss of system electrical power and/or the like. For example, the present invention can be practiced with pumps, such as but not limited to water pumps, mills, such as but not limited to watermills or windmills, and/or the like.

Referring generally to the Figures, there is shown a clutch system 1, in accordance with the general teachings of the present invention. It should be appreciated that one or more of the following list of general components of the clutch system 1 may be modified, substituted, or eliminated without substantially affecting the performance and/or operation of the present invention.

The general components shown are, optionally, at least one pan-head screw 10 or other suitable fastener, a bearing 20, at least one Belleville washer 30, optionally, a bushing 40, a clutch disk 50, a drag spring 60, at least one friction pad 70, a housing assembly 80, an inner race 90, an outer race 100, an output disk 110, a retaining ring 120, a centering or return spring 130, at least one roller 140, a roller cage 150, optionally, a spacer 160, optionally, a spring backing 170, optionally, a spring retainer 180, and, optionally, a wave spring 190.

Because the two-way clutch system 1 of the present invention can drive in both directions, torque from the power steering motor PSM is provided in both directions of rotation.

Figure 2:
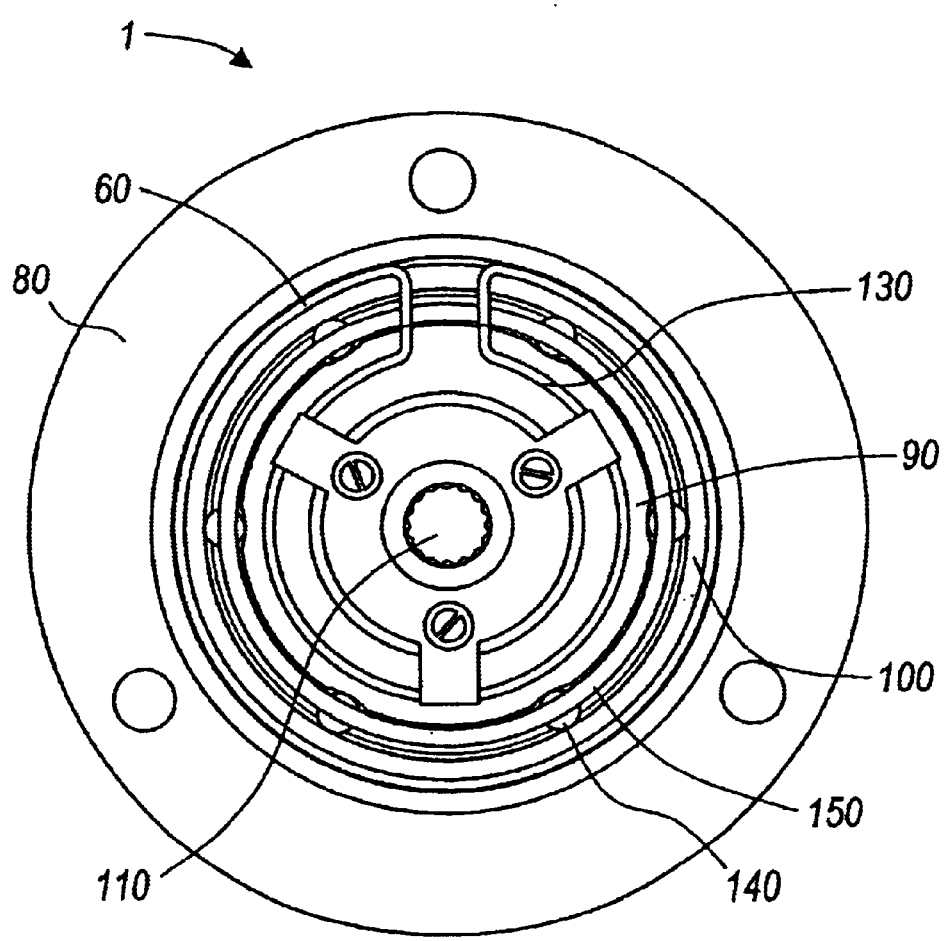
FIG. 2 is an axial view of the clutch system for an exemplary power steering system depicted in FIG. 1
Figure 2A:
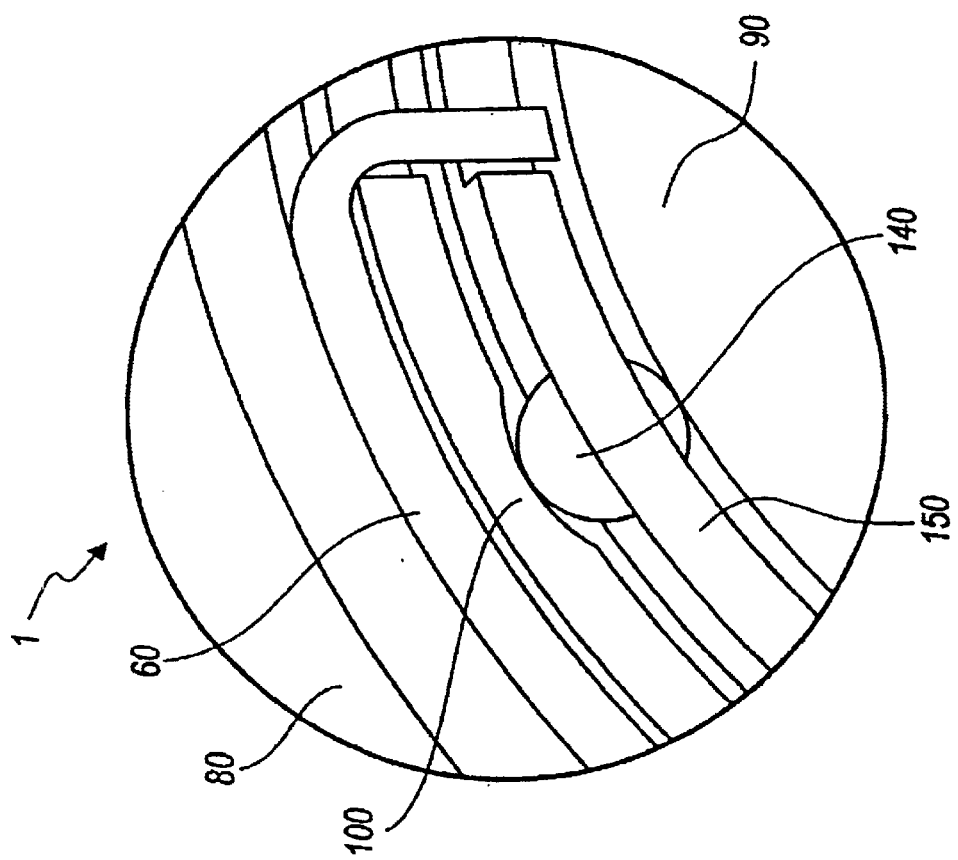
FIG. 2A is a partial axial view of a detail of an alternative clutch system for an exemplary power steering system depicted in FIG. 1, in accordance with the general teachings of the present invention.

In accordance with a preferred embodiment of the present invention, the inner race 90 is preferably cammed and the outer race 100 is preferably relatively smooth and cylindrical, although it should be appreciated that these particular features could be reversed, i.e., the inner race 90 can be smooth and cylindrical, and the outer race 100 can be cammed (as specifically shown in FIG. 2A).

In accordance with a preferred embodiment, the roller cage 150 is provided with pockets or depressions to accommodate the rollers 140. During normal conditions, the return spring 130 preferably urges the roller cage 150 into the disengaged position, generally keeping the rollers 140 in the middle of the cammed surfaces.

However during operation of the present invention (e.g., during kickback), as the inner race 90 rotates relative to the housing assembly 80, the friction from the drag spring 60 preferably overcomes the return spring 130, allowing the roller cage 150 to lag behind the inner race 90, thus forcing the rollers 140 into engagement between the cammed inner race 90 and the cylindrical outer race 100.

In accordance with one embodiment of the present invention, the outwardly directed tangs of the substantially omega-shaped return spring 130 fit into notches on adjacent axial faces of the inner race 90 and the roller cage 150. The drag spring 60 with inwardly bent tangs also fits into the notch on the roller cage 150. However, by virtue of the friction that the drag spring 60 generates against the stationary housing assembly 80, it will overcome the return spring 130 and allow the roller cage 150 to rotate relative to the inner race 90, forcing the rollers 140 to wedge between the cammed surfaces and the inner surface of the outer race 100. When torque comes in from the outer race 100, the drag spring 60, return spring 130, roller cage 150 and inner race 90 are unaffected, so no torque is transmitted through the clutch. The drag spring 60 can also be any simple friction element that contacts the stationary housing assembly 80 to overcome the force of the return spring 130.

The clutch system 1 of the present invention preferably operates in all potential failure modes of the power assisted steering system PASS of the vehicle. In normal operation, when the power steering motor PSM is providing supplemental torque to the power assisted steering system PASS the torque from the power steering motor PSM is brought into the dutch section through a connection between the power steering motor shaft and the clutch inner race. However, in the event of a failure of the automobile's electrical system or the power steering motor PSM, then torque from the steering wheel is back fed into the two-way clutch system of the present invention. If not for the action of the two-way clutch system of the present invention, the inertia of the power steering motor PSM being driven back through the speed reducer (now acting as a speed increaser because it is being driven in reverse) would be relatively large, requiring extraordinary effort from the driver to turn the steering wheel even slightly.

However, with the two-way clutch system of the present invention in place, the back driving torque simply rotates the outer race of the clutch, without engaging any other corqonents of the power assisted steering system PASS that would substantially interfere with manual operation of the steering wheel.

In some cases under normal operation, such as highway cruising, the EPAS system is not really necessary, as the driver input is sufficient to make the needed minor directional changes without assistance. In this case, the electric motor can be inactive and the clutch will disconnect the EPAS from the steering system, effectively leaving the vehicle with relatively old-fashioned manual (i.e., non-power) steering, which would be sufficient for such operation.

In certain other cases, the speed reduction section of the EPAS could be damaged by shock impact being fed back through the system when the clutch is engaged and driving in one direction. For instance, if the vehicle is being turned with the EPAS engaged, impact with a pothole or curb forcing the wheel in the same direction as it is being driven would cause back-driven torque to be sent through the system. Thus, the worm gear and worm wheel in the speed reducer could be stripped of their teeth in such an isolated case. Therefore, a torque-limiting feature or system is provided for the clutch system 1 of the present invention.

Figure 3:
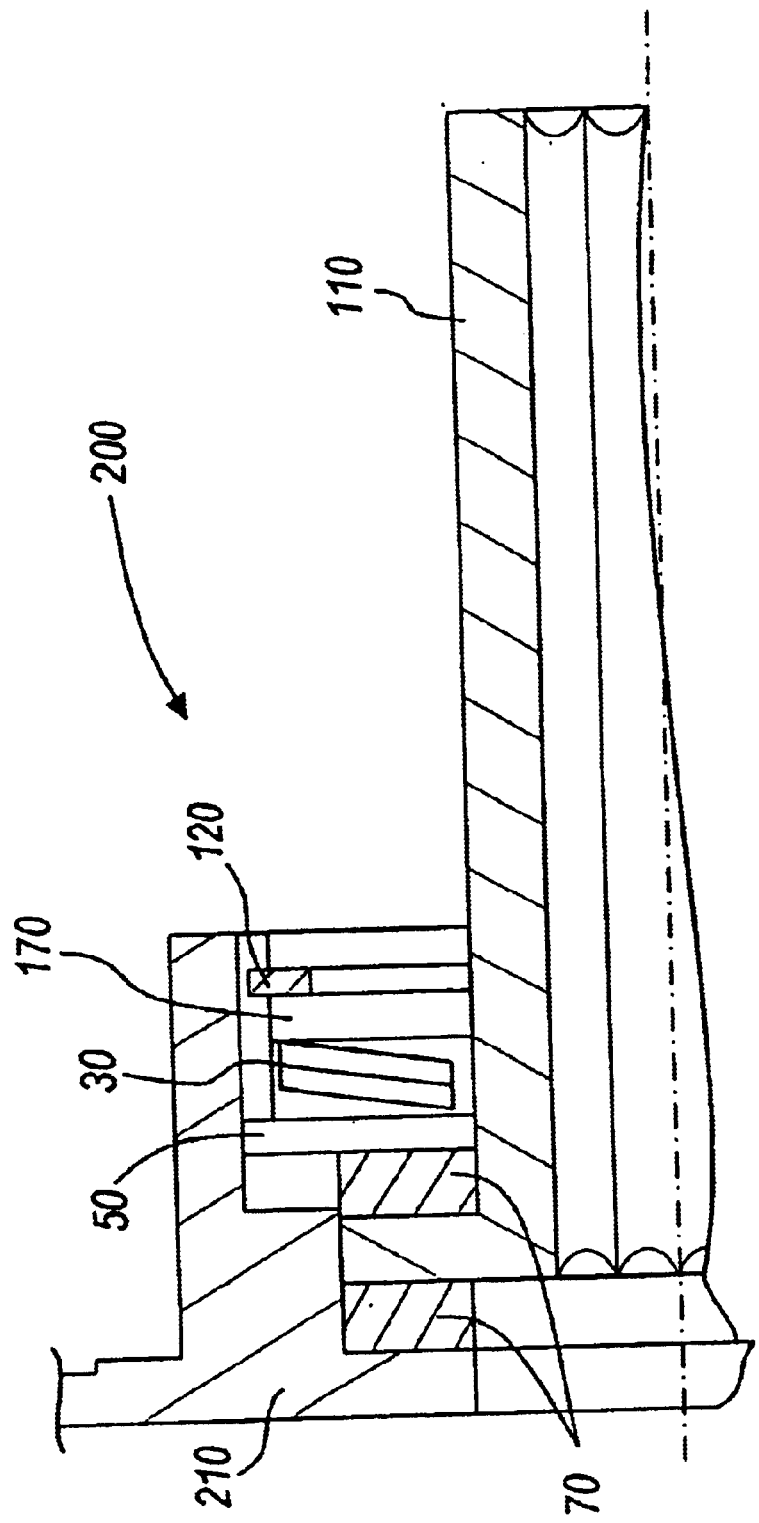
FIG. 3 is a partial cross-sectional view of a detail of the clutch system for an exemplary power steering system depicted in FIG. 1, in accordance with the general teachings of the present invention.

The torque-limiting system 200 is specifically shown in FIG. 3. The torque-limiting feature consists primarily of a housing 210 (that is integral to the two-way clutch's outer race 100), and a plurality of clutch disks 50 which are alternately splined to the output shaft 110 and housing 210. A snap ring 120 and backing washer 170 hold a Belleville washer 30 in place at a preset and/or predetermined force level, compacting the clutch disks 50, providing for a consistent torque level when the output shaft 110 and housing 210 are rotated relative to one another. By way of a non-limiting example, the maximum torque level of the clutch system 1 could be preset to 10N-m (i.e., torque limiter setting).

As previously noted, the torque-limiting feature of the present invention consists of a series of clutch disks 50 clamped at a preset and/or predetermined level to slip at a specified torque. In accordance with one embodiment of the present invention, a pair of friction pads 70 is employed to selectively engage the output shaft 110 to achieve the torque-limiting function.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A clutch system having a power input member and a power output member, comprising:
   a housing member;
   an inner race member contained within the housing member and being coaxially disposed about the power input member, the inner race member being capable of rotating in either a first or a second direction in response to a torque force from the power input member;
   an outer race member contained within the housing member and being coaxially disposed about the inner race member, the outer race member being in physical cooperation with the inner race member, the outer race member being capable of rotating in either a first or a second direction;
   a roller member disposed between the inner and outer race members;
   a retainer member for retaining the roller member between the inner race member and the outer race member;
   a spring member in physical cooperation with the inner race member and the retainer member, the spring member exerting a spring force on the inner race member and the retainer member; and
   a friction member in physical cooperation with the retainer member and the housing, the friction member being selectively operable to overcome the spring force of the spring member to allow the inner race member to rotate relative to the retainer member;
   wherein the friction member is selectively operable to permit the roller member to physically engage at least a portion of a surface of the outer and inner race members in response to a torque force being applied to the power input member in either a first or a second direction and to physically disengage from at least a portion of a surface of the outer or inner race members in response to a torque force being applied to the power output member in either a first or a second direction.

2. The invention according to claim 1, wherein the clutch system is in operable cooperation with a power assisted steering system for a vehicle, wherein the power assisted steering system indudes a power steering motor, wherein the power output member is capable of rotating in either a first or second direction in response to a torque force, the power input member being in physical cooperation with the power steering motor.

3. The invention according to claim 1, wherein inner race member includes at least one cammed surface.

4. The invention according to claim 1, wherein inner race member includes three cammed surfaces.

5. The invention according to claim 1, wherein the inner race member is substantially cylindrical.

6. The invention according to claim 1, wherein the roller member is substantially disposed within the at least one cammed surface of the inner race member.

7. The invention according to claim 1, wherein the outer race member is substantially cylindrical.

8. The invention according to claim 1, wherein outer race member includes at least one cammed surface.

9. The invention according to claim 1, wherein outer race member includes three cammed surfaces.

10. The invention according to claim 1, further comprising a torque limitation system, wherein the torque limitation system comprises:
    a second housing member;
    the power output member being capable of rotating relative to the second housing member; and
    at least one clutch member in physical cooperation with the second housing member and the power output member, the at least one clutch member having a compressive force applied thereto so as to establish a preset torque level between the second housing member and the power output member;
    wherein the at least one clutch member is selectively operable so as to slip in response to the application of a torque force in excess of the preset torque level.

11. The invention according to claim 10, wherein the at least one clutch member includes a splined surface.

12. The invention according to claim 11, wherein the preset torque level is about 10N-m.

13. A clutch system for use in conjunction with a power assisted steering system for a vehicle, wherein the power assisted steering system includes a power steering motor, a power input member capable of rotating in either a first or a second direction in response to a torque force, and a power output member, the power input member being in physical cooperation with the power steering motor, comprising:
    a housing member;
    an inner race member contained within the housing member and being coaxially disposed about the power input member, the inner race member being capable of rotating in either a first or a second direction in response to a torque force from the power input member;
    an outer race member contained within the housing member and being coaxially disposed about the inner race member, the outer race member being in physical cooperation with the inner race member, the outer race member being capable of rotating in either a first or a second direction;
    a roller member disposed between the inner and outer race members;
    a retainer member for retaining the roller member between the inner race member and the outer race member;
    a spring member in physical cooperation with the inner race member and the retainer member, the spring member exerting a spring force on the inner race member and the retainer member; and
    a friction member in physical cooperation with the retainer member and the housing, the friction member being selectively operable to overcome the spring force of the spring member to allow the inner race member to rotate relative to the retainer member;
    wherein the friction member is selectively operable to permit the roller member to physically engage at least a portion of a surface of the outer and inner race members in response to a torque force being applied to the power input member in either a first or a second direction and to physically disengage from at least a portion of a surface of the outer or inner race members in response to a torque force being applied to the power output member in either a first or a second direction.

14. The invention according to claim 13, wherein inner race member includes at least one cammed surface.

15. The invention according to claim 14, wherein the roller member is substantially disposed within the at least one cammed surface of the inner race member.

16. The invention according to claim 13, wherein the outer race member is substantially cylindrical.

17. The invention according to claim 13, further comprising a torque limitation system, wherein the torque limitation system comprises:
a second housing member;
the power output member being capable of rotating relative to the second housing member; and
at least one clutch member in physical cooperation with the second housing member and the power output member, the at least one clutch member having a compressive force applied thereto so as to establish a preset torque level between the second housing member and the power output member;
wherein the at least one clutch member is selectively operable so as to slip in response to the application of a torque force in excess of the preset torque level.

18. The invention according to claim 17, wherein the at least one clutch member includes a splined surface.

19. The invention according to claim 17, wherein the preset torque level is about 10N-m.

20. A power assisted steering system for a vehicle, comprising:
a power steering motor;
a power output member capable of rotating in either a first or a second direction in response to a torque force, the power output member being in physical cooperation with the power steering motor; and
a plutch system disposed between the power steering motor and the power output member, the clutch system being coaxially disposed about the power output member, the clutch system being in physical cooperation with the power output member;
wherein the clutch system is selectively operable to physically disengage from the power output member in response to a torque force being applied to the power output member in either a first or a second direction;
wherein the clutch system comprises:
a housing member;
an inner race member contained within the housing member and being coaxially disposed about the power input member, the inner race member being capable of rotating in either a first or a second direction in response to a torque force from the power input member;
an outer race member contained within the housing member and being coaxially disposed about the inner race member, the outer race member being in physical cooperation with the inner race member, the outer race member being capable of rotating in either a first or a second direction;
a roller member disposed between the inner and outer race members;
a retainer member for retaining the roller member between the inner race member and the outer race member;
a spring member in physical cooperation with the inner race member and the retainer member, the spring member exerting a spring force on the inner race member and the retainer member; and
a friction member in physical cooperation with the retainer member and the housing, the friction member being selectively operable to overcome the spring force of the spring member to allow the inner race member to rotate relative to the retainer member;
wherein the friction member is selectively operable to permit the roller member to physically engage at least a portion of a surface of the outer and inner race members in response to a torque force being applied to the power input member in either a first or a second direction and to physically disengage from at least a portion of a surface of the outer or inner race members in response to a torque force being applied to the power output member in either a first or a second direction.

21. The invention according to claim 20, wherein inner race member includes at least one cammed surface.

22. The invention according to claim 20, wherein the roller member is substantially disposed within the at least one cammed surface of the inner race member.

23. The invention according to claim 20, wherein the outer race member is substantially cylindrical.

24. The invention according to claim 20, further comprising a torque limitation system, wherein the torque limitation system comprises:
a second housing member;
the power output member being capable of rotating relative to the second housing member; and
at least one clutch member in physical cooperation with the second housing member and the power output member, the at least one clutch member having a compressive force applied thereto so as to establish a preset torque level between the second housing member and the power output member;
wherein the at least one clutch member is selectively operable so as to slip in response to the application of a torque force in excess of the preset torque level.

25. The invention according to claim 24, wherein the at least one clutch member includes a splined surface.

26. The invention according to claim 24, wherein the preset torque level is about 10N-m.

27. A power assisted steering system for a vehicle, comprising:
a power steering motor;
a power input member capable of rotating either in a first or a second direction in response to a torque force, the power input member being in physical cooperation with the power steering motor;
a clutch system disposed between the power steering motor and a power output member, the clutch system being coaxially disposed about the power output member, the clutch system being in physical cooperation with the power output member, wherein the clutch system comprises:
a housing member;
an inner race member contained within the housing member and being coaxially disposed about the power input member, the inner race member being capable of rotating in either a first or a second direction in response to a torque force from the power input member;

an outer race member contained within the housing member and being coaxially disposed about the inner race member, the outer race member being in physical cooperation with the inner race member, the outer race member being capable of rotating in either a first or a second direction;

a roller member disposed between the inner and outer race members;

a retainer member for retaining the roller member between the inner race member and the outer race member;

a spring member in physical cooperation with the inner race member and the retainer member, the spring member exerting a spring force on the inner race member and the retainer member; and a friction member in physical cooperation with the retainer member and the housing, the friction member being selectively operable to overcome the spring force of the spring member to allow the inner race member to rotate relative to the retainer member;

wherein the friction member is selectively operable to permit the roller member to physically engage at feast a portion of a surface of the outer and inner race members in response to a torque force being applied to the power input member in either a first or a second direction and to physically disengage from at least a portion of a surface of the outer or inner race members in response to a torque force being applied to the power output member in either a first or a second direction.

28. The invention according to claim 27, wherein inner race member includes at least one cammed surface.

29. The invention according to claim 27, wherein the roller member is substantially disposed within the at least one cammed surface of the inner race member.

30. The invention according to claim 27, wherein the outer race member is substantially cylindrical.

31. The invention according to claim 27, further comprising a torque limitation system, wherein the torque limitation system comprises:

a second housing member;

the power output member being capable of rotating relative to the second housing member; and at least one clutch member in physical cooperation with the second housing member and the power output member, the at least one clutch member having a compressive force applied thereto so as to establish a preset torque level between the second housing member and the power output member;

wherein the at least one clutch member is selectively operable so as to slip in response to the application of a torque force in excess of the preset torque level.

32. The invention according to claim 31, wherein the at least one clutch member includes a splined surface.

33. The invention according to claim 31, wherein the preset torque level is about 10N-m.

34. A power assisted steering system for a vehicle, comprising:

a power steering motor;

a power output member capable of rotating in either a first or a second direction in response to a torque force, the power output member being in physical cooperation with the power steering motor;

a clutch system disposed between the power steering motor and the power output member, the clutch system member being coaxially disposed about the power output member, the clutch system being in physical cooperation with the power output member;

wherein the clutch system is selectively operable to physically disengage from the power output member in response to a torque force being applied to the power output member in either a first or a second direction; and a torque limitation system, wherein the torque limitation system comprises:

a housing member;

the power output member being capable of rotating relative to the housing member; and at least one clutch member in physical cooperation with the housing member and the power output member, the at least one clutch member having a compressive force applied thereto so as to establish a preset torque level between the housing member and the power output member;

wherein the at least one clutch member is selectively operable so as to slip in response to the application of a torque force in excess of the preset torque level.

35. The Invention according to claim 34, wherein the at least one clutch member includes a splined surface.

36. The invention according to claim 34, wherein the preset torque level is about 10N-m.

37. A power assisted steering system for a vehicle, comprising:

a power steering motor;

a power input member capable of rotating either in a first or a second direction in response to a torque force, the power input member being in physical cooperation with the power steering motor;

a clutch system disposed between the power steering motor and a power output member, the clutch system being coaxially disposed about the power output member, the clutch system being in physical cooperation with the power output member, wherein the clutch system comprises:

a housing member;

an inner race member contained within the housing member and being coaxially disposed about the power input member, the inner race member being capable of rotating in either a first or a second direction in response to a torque force from the power input member;

an outer race member contained within the housing member and being coaxially disposed about the inner race member, the outer race member being in physical cooperation with the inner race member, the outer race member being capable of rotating in either a first or a second direction;

a roller member disposed between the inner and outer race members;

a retainer member for retaining the roller member between the inner race member and the outer race member;

a spring member in physical cooperation with the inner race member and the retainer member, the spring member exerting a spring force on the inner race member and the retainer member; and a friction member in physical cooperation with the retainer member and the housing, the friction member being selectively operable to overcome the spring force of the spring member to allow the inner race member to rotate relative to the retainer member;

wherein the friction member is selectively operable to permit the roller member to physically engage at least a portion of a surface of the outer and inner race members in response to a torque force being applied to the power input member in either a first or a second direction and to physically disengage from at least a portion of a surface of the outer or inner race members in response to a torque force being applied to the power output member in either a first or a second direction; and a torque limitation system, wherein the torque limitation system comprises:

a housing member;

the power output member being capable of rotating relative to the housing member; and at least one clutch member in physical cooperation with the housing member and the power output member, the at least one clutch member having a compressive force applied thereto so as to establish a preset torque level between the housing member and the power output member;

wherein the at least one clutch member is selectively operable so as to slip in response to the application of a torque force in excess of the preset torque level.

38. The invention according to claim 37, wherein the at least one clutch member includes a splined surface.

39. The invention according to claim 37, wherein the preset torque level is about 10N-m.

* * * * *

UNITED STATES PATENT AND TRADEMARK OFFICE
CERTIFICATE OF CORRECTION

PATENT NO. : 6,817,457 B2  Page 1 of 1
DATED : November 16, 2004
INVENTOR(S) : Russell E. Monahan et al.

It is certified that error appears in the above-identified patent and that said Letters Patent is hereby corrected as shown below:

Column 6,
Line 17, "PASS" should be -- PASS, --.
Line 19, "dutch" should be -- clutch --.
Lines 33-34, "corqo-nents" should be -- components --.

Column 7,
Line 59, "indudes" should be -- includes --.

Column 9,
Line 40, "plutch" should be -- clutch --.

Column 11,
Line 24, "feast" should be -- least --.

Column 12,
Line 23, "Invention" should be -- invention --.

Signed and Sealed this

Eleventh Day of April, 2006

JON W. DUDAS
*Director of the United States Patent and Trademark Office*